US010575542B2

(12) United States Patent
Williams et al.

(10) Patent No.: US 10,575,542 B2
(45) Date of Patent: Mar. 3, 2020

(54) FOOD PRODUCT PERMEATED WITH HOMOGENIZED DISPERSION

(71) Applicant: ConAgra Foods RDM, Inc., Omaha, NE (US)

(72) Inventors: Tracey Williams, Dallas, TX (US); Larry Quint, Omaha, NE (US); Brian Degner, Omaha, NE (US)

(73) Assignee: Conagra Foods RDM, Inc., Chicago, IL (US)

( * ) Notice: Subject to any disclaimer, the term of this patent is extended or adjusted under 35 U.S.C. 154(b) by 858 days.

(21) Appl. No.: 13/941,704

(22) Filed: Jul. 15, 2013

(65) Prior Publication Data

US 2013/0302501 A1 Nov. 14, 2013

Related U.S. Application Data

(63) Continuation of application No. 11/732,065, filed on Apr. 2, 2007, now abandoned, and a continuation of application No. 11/707,250, filed on Feb. 13, 2007, now abandoned.

(60) Provisional application No. 60/853,270, filed on Oct. 19, 2006, provisional application No. 60/848,923, filed on Oct. 3, 2006.

(51) Int. Cl.
*A23L 13/00* (2016.01)
*A23L 17/00* (2016.01)
*A23L 13/70* (2016.01)

(52) U.S. Cl.
CPC .............. *A23L 13/03* (2016.08); *A23L 13/70* (2016.08); *A23L 13/72* (2016.08); *A23L 17/75* (2016.08)

(58) Field of Classification Search
CPC .... A23L 11/3257; A23L 1/318; A23L 1/3103; A23L 1/00; A23L 1/31; A23L 1/3106; A23L 1/3182; A23L 1/325; A23L 13/03; A23L 17/75; A23L 13/72; A23L 13/70
USPC ....... 426/601, 602, 643, 641, 650, 652, 531, 426/589
See application file for complete search history.

(56) References Cited

U.S. PATENT DOCUMENTS

| | | | |
|---|---|---|---|
| 5,011,701 A | 4/1991 | Baer et al. | 426/573 |
| 5,104,679 A * | 4/1992 | Jurcso | 426/602 |
| 5,158,794 A * | 10/1992 | Halden et al. | 426/281 |
| 6,485,775 B1 * | 11/2002 | Camin | A21D 2/186 |
| | | | 426/518 |
| 2007/0031550 A1 * | 2/2007 | Samson et al. | 426/392 |

OTHER PUBLICATIONS

"Metalquimia: Spray marinating: A definitive solution for improving meat texture"; 6th Edition; Technology Department of Metalquimia, S.A.; Jan. 25, 2007.

* cited by examiner

*Primary Examiner* — Subbalakshmi Prakash
(74) *Attorney, Agent, or Firm* — Ryan T. Grace; Advent, LLP

(57) ABSTRACT

The present invention is a food product and a method of creating the food product that satisfies the need for a homogenized dispersion that disperses throughout meat, wherein the particle size of macromolecular ingredients within the dispersion is reduced to form a more stable homogenized dispersion with increased ingredient functionality. This permeated meat offers added health benefits such as the substitution of the anti-oxidant rich olive oil for problematic animal fat.

16 Claims, 5 Drawing Sheets

FOOD PRODUCT PERMEATED WITH HOMOGENIZED DISPERSION

CROSS REFERENCE TO RELATED APPLICATIONS

This application is a continuation of U.S. application Ser. No. 11/732,065 filed Apr. 2, 2007, entitled FOOD PRODUCT PERMEATED WITH HOMOGENIZED DISPERSION, which application claims priority to U.S. application Ser. No. 11/707,250 filed Feb. 13, 2007, entitled FOOD PRODUCT PERMEATED WITH HOMOGENIZED DISPERSION, which application claims priority to U.S. Provisional Application Ser. No. 60/853,270 filed Oct. 19, 2006, entitled FOOD PRODUCT PERMEATED WITH HOMOGENIZED DISPERSION, which application claims priority to U.S. Provisional Application Ser. No. 60/848,923 filed Oct. 3, 2006, entitled FOOD PRODUCT PERMEATED WITH HOMOGENIZED DISPERSION. The complete disclosures of the aforementioned applications are incorporated herein in their entirety.

FIELD OF THE INVENTION

The present invention generally relates to the field of food products, and more particularly to a permeated food product for consumption, such as meat permeated with a homogenized dispersion.

BACKGROUND OF THE INVENTION

Organoleptic properties of meat, or any food in general, are defined by the attributes perceived by the consumer when the product is eaten. Among the attributes that most influence consumer satisfaction are those related to texture and consistency, characterized by impressions of tenderness and juiciness, and the flavor that results from a combination of olfactory and gustative sensations, which is what we call taste.

Meat tenderness is defined as the difficulty or ease with which the meat can be cut or chewed. The impression of tenderness is directly related to four main factors: degradation of the muscle fiber, the contractile state of the muscle, the quantity and distribution of connective tissue, and the quantity of intra-muscular fat. These factors are susceptible to genetic or environmental variation.

Juiciness plays a very important role in the general impression palatability perceived by the consumer. It could be defined as the impression that results from chewing, caused by the juices released from the meat during the process. Meat juices contain many aromatic and volatile components responsible for flavor, and also help to soften and fragment the meat during chewing. In addition they stimulate the production of saliva, which provides a sustained impression of juiciness. The lack of juiciness in meat limits its acceptability and destroys its unique sensory virtues.

Palatability, i.e., texture characterized by the attributes of tenderness and juiciness, is the sensory quality that most influences product acceptability on part of the consumer. Because palatability is the property on which today's consumers place most emphasis when defining their preferences in the purchasing of meat, texture is a characteristic of great economic importance. This texture characteristic is very difficult to control mainly because it depends on so many factors (environmental, handling, genetic). These factors may either act alone and/or in combination with others. For instance, the elapsed time from the point of slaughter, the required cooking temperature, and the amount of intramuscular fat are just a few examples of these contributory factors.

Consumers are relying more on the convenience of precooked meats. Simultaneously, the meat processing industry is responding to increasing concerns for food safety. USDA requirements may force manufacturers to cook the meat products at a temperature which is optimum in terms of safety, but in optimum in terms of palatability. Further, because the precooked product must be reheated in many cases, the meat products ultimately endure a second cooking process before being consumed. This second cooking process results in further degradation of palatability attributes.

It is known that food manufacturers may add functional ingredients to meat products to improve palatability, but in particular, the addition of functional ingredients for precooked products is crucial. Unfortunately, many of these functional ingredients used with ingredient technology are of a large particle size. With prior art, the functional ingredients may improve portions of the meat. However, the large particle size or lack of uniform dispersion among the ingredients may cause the ingredients to distribute unevenly, or even congeal within the delivery mechanism before being delivered to the food product. As such, undesirable results such as uneven distribution of flavor, dry pockets, oily pockets, toughness, or uneven texture may occur.

Consequently, it would be desirable to provide a method for adding functional ingredients to meat such that a homogenized dispersion of functional ingredients distributes evenly throughout the meat, wherein the particle size of the ingredients within the dispersion is reduced to form a homogenized dispersion with increased ingredient functionality. Further it would be desirable to provide ingredient technology that enables precooked meat to retain moisture through a re-heating process that equates to near double cooking.

SUMMARY OF THE INVENTION

The present invention is directed to a food product and a method of creating the food product that satisfies this need for a homogenized dispersion that distributes throughout a meat, wherein the particle size of macromolecular ingredients within the homogenized dispersion is reduced to form a homogenized dispersion with increased ingredient functionality. The present invention embodies a method for enhancing the palatability of meats. The method includes combining flavor and quality enhancing ingredients, homogenization of those ingredients, and delivery of those ingredients to a meat, wherein the ingredients may be more evenly distributed so as to more consistently enhance tenderness and juiciness. For the purposes of continuity and clarity, the term "meat" as used within this entire application includes beef, pork, poultry, meat, seafood, lamb, and goat.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 1a and 1b are color cross-section photographs of fully cooked chicken breast; wherein FIG. 1a illustrates prior art distribution of injected marinade, herein where the marinade contains oil stained with beta-carotene; and wherein FIG. 1b illustrates an embodiment of the present invention, illustrating greater uniform distribution of marinade over the prior art.

DETAILED DESCRIPTION OF THE INVENTION

Figure 1A:
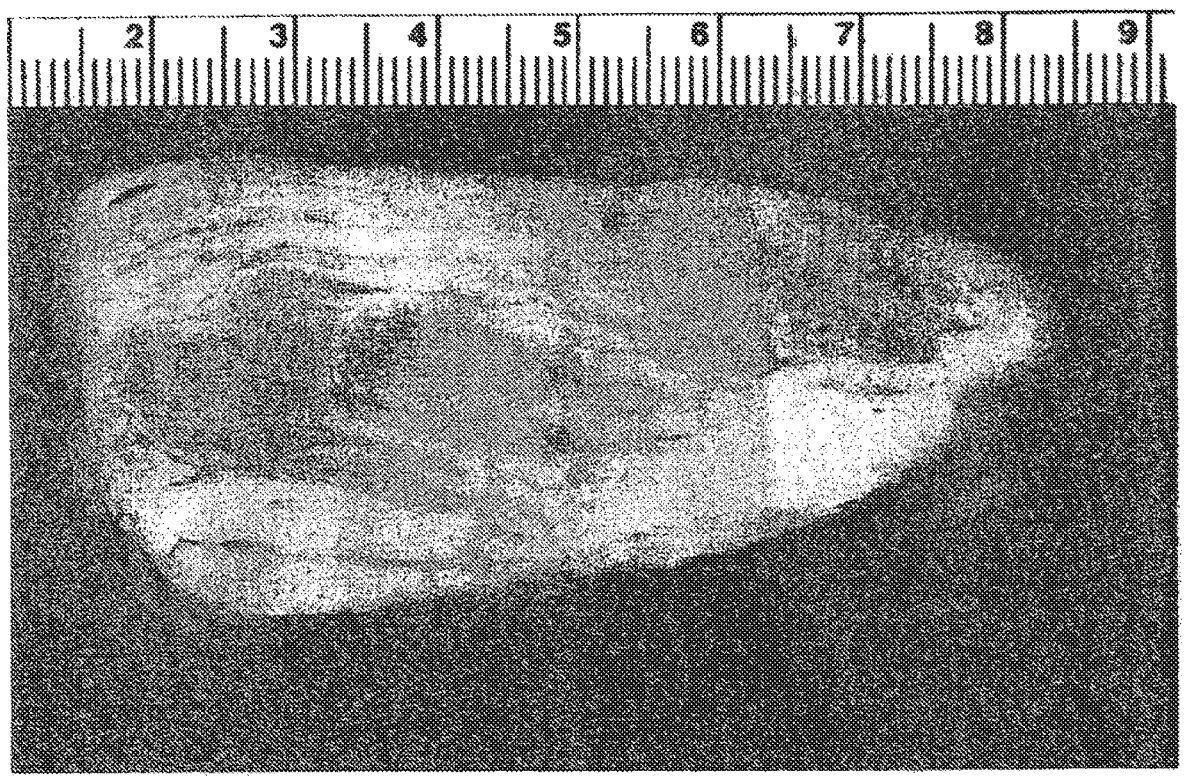
Figure 1B:
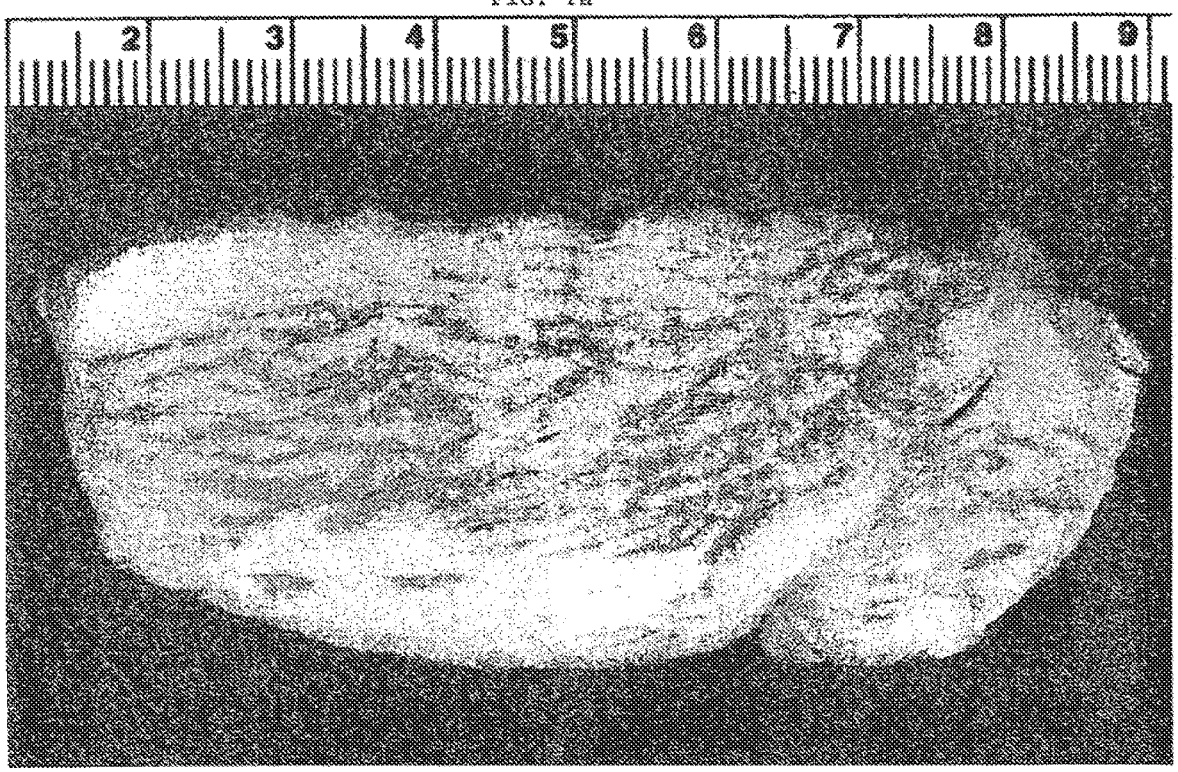
Figure 3:
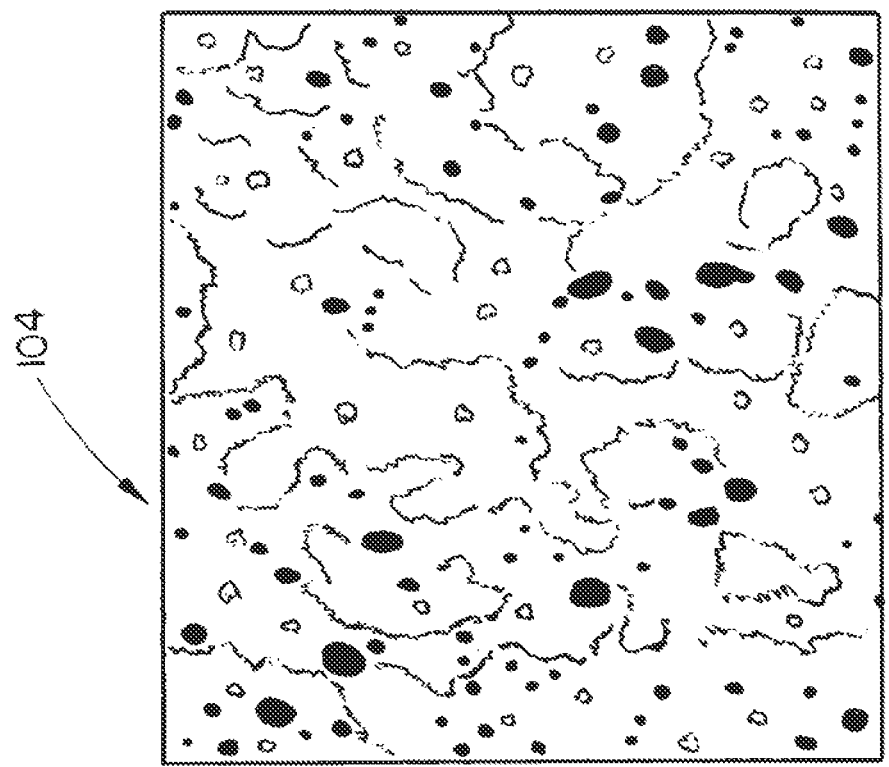
FIG. 3 is a top plan view of a diagrammatic illustration of the homogenized dispersion of the present invention (as illustrated in FIG. 1b)
Figure 2:
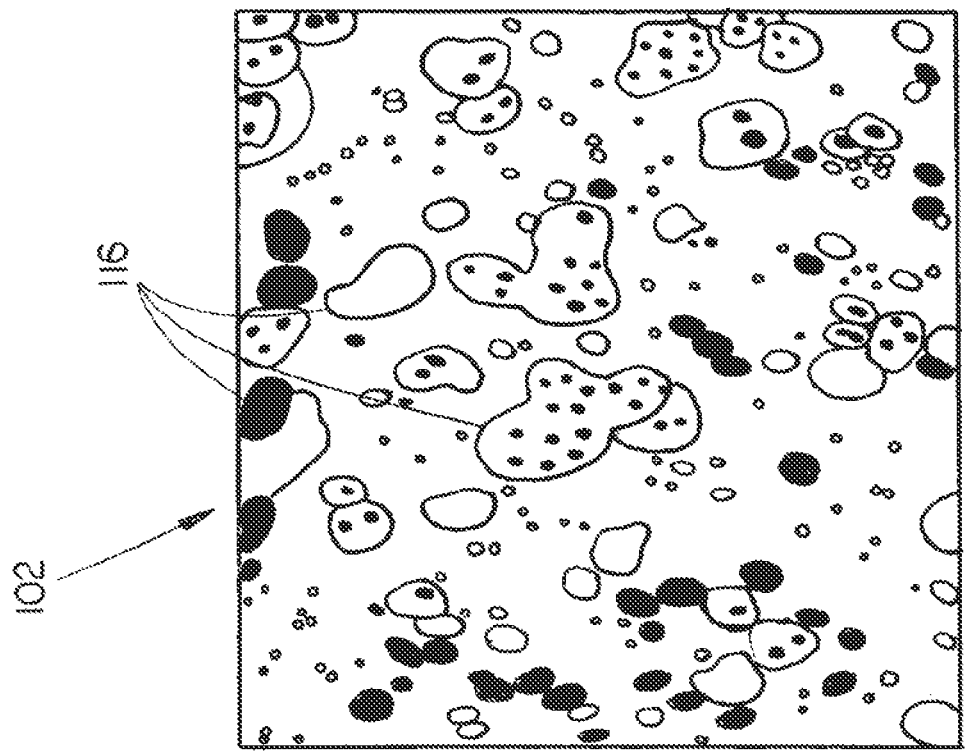
FIG. 2 is a top plan view of a diagrammatic illustration of a micrograph of a prior marinade (as illustrated in FIG. 1a)
Figure 4:
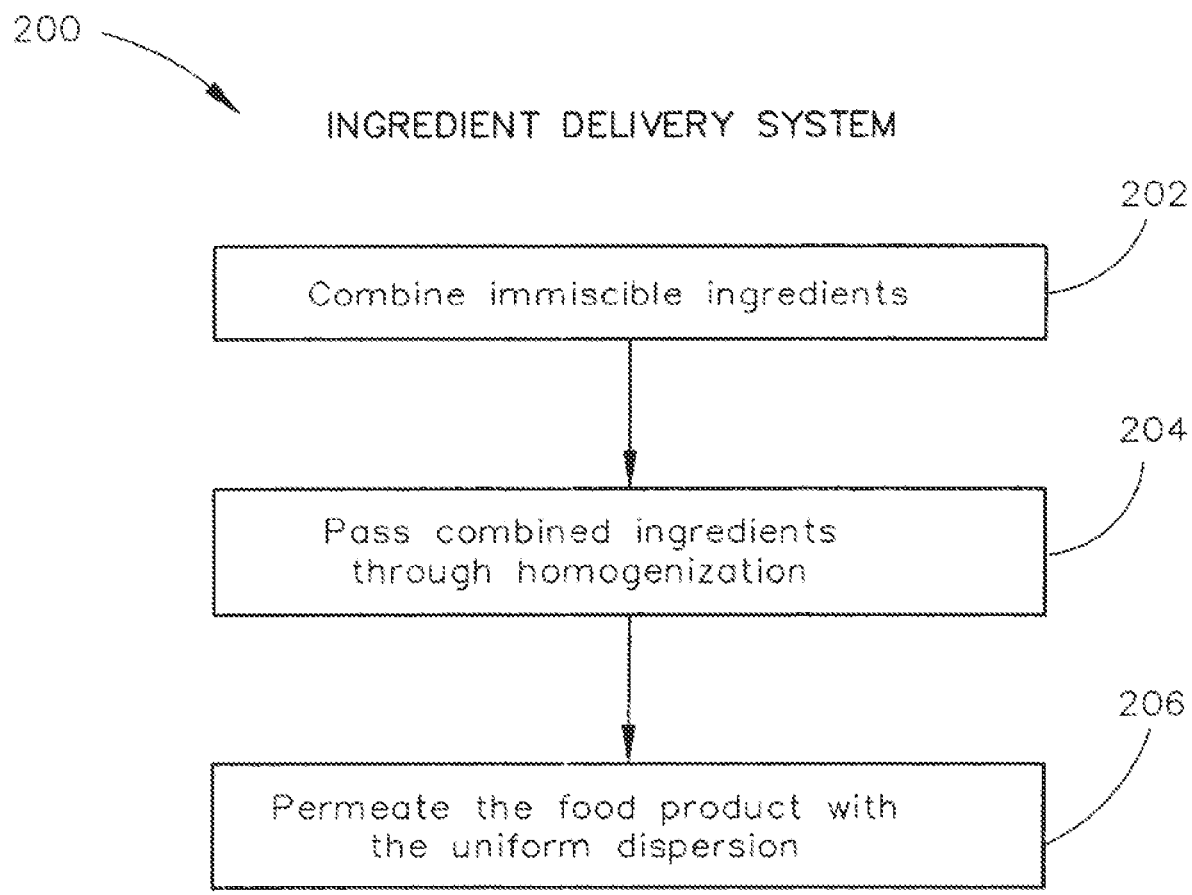
FIG. 4 is a block diagram illustrating an ingredient delivery system in accordance with the present invention employing a method for permeating meat with a homogenized dispersion.

Reference will now be made in detail to the presently preferred embodiments of the invention, examples of which are illustrated in the accompanying drawings.

Referring to FIGS. 1 through 6, a method for introducing functional ingredients to a meat such that the meat is permeated with an evenly distributed homogenized dispersion 104 wherein the particle size of ingredients of a high relative molecular mass, within the dispersion 102 is reduced to form a homogenized dispersion 104 with increased ingredient functionality is described in accordance with exemplary embodiments of the present invention. For the purposes of continuity and clarity, the phrase meat as used within this entire application includes beef, pork, meat, poultry, seafood, lamb, and goat.

In accordance with the present invention, the method 200 of treating a meat begins with the step 202 of combining at least two ingredients to form a continuous and dispersed phase (i.e., ingredients such as oil and water that do not naturally form a single homogenous phase when mixed) wherein at least one of the ingredients is from a group that consists of flavor, tenderness, juiciness, and mouthfeel enhancers to create a flavor and palatability enhancing dispersion 102. In embodiments, the ingredients in the homogenized dispersion may include one or more ingredients such as oil, gum, starch, fiber, protein, or the like.

Because the large particle size of the ingredients used and the colloidal nature of the palatability enhancers make for difficulty in attaining uniform dispersion throughout the meat, the second step 204 of the present method 200 is to employ a homogenizing technology to the dispersion 102, i.e. a technology that renders the dispersion substantially uniform in consistency by homogenizing the ingredient particles. A homogenized dispersion 104 with evenly dispersed ingredients is generally more stable, i.e., the particles better resist the tendency to separate into distinct phases (e.g., distinct phases 116). Because a homogenized dispersion 104 with smaller particles better resists the tendency to separate into phases, a homogenized dispersion 104 better disperses throughout a meat product. Even distribution allows for evenly distributed functionality and evenly distributed results. Therefore, the homogenizing technology, the second step 204 of the present method 200, ultimately allows for increased ingredient functionality due to a more even dispersion of the ingredient particles throughout a meat product.

Without referring to a specific threshold of homogenization, this application refers to a dispersion 102 that has undergone the second step 204 of the present method 200 as the "homogenized" dispersion 104. It will be appreciated that different levels of homogenization may result from the second step 204 of the present method 200 without departing from the spirit or scope of the present invention.

Once the technology 204 has homogenized the dispersion 102 to create the homogenized dispersion 104, the third step 206 of the present method 200 is delivery to the meat such that the homogenized dispersion 104 evenly disperses throughout the tissue of the meat.

In exemplary embodiments of the present invention, various techniques may be used for ingredient delivery 206. Preferably, the functional ingredients are delivered via injection. In one specific embodiment, the functional ingredients are delivered via a multi-needle injector, wherein the injector utilizes a centrifugal pump to propel the homogenized dispersion 104 through the needles with holes of between 1 mm to 4 mm in diameter. The multi-needle injector deposits the marinade during either its upward or downward stroke through the meat, forming a brine deposit in the needles' penetration zone. It is contemplated that alternate methods of ingredient delivery 206 may be utilized with the homogenized dispersion 104. For example, immersion, massage, marinating, glazing, vacuum tumbling, or the like may be used to deliver 206 the homogenized dispersion to the meat without departing from the scope or intent of the invention.

In exemplary embodiments, the homogenized ingredients 104 may permeate better throughout the tissue of the meat because of their decreased particle size. For example, with the prior art, meat processors were aware that the addition of a lipid increased juiciness and overall palatability of the meat. However, consumers detected an oily mouthfeel if the lipid exceeded a certain threshold, such as 1% of the mass. In an exemplary embodiment of the present invention, this lipid threshold is increased because the lipid is more evenly dispersed. An evenly dispersed lipid 104 better mimics the natural palatability enhancing qualities of intramuscular fat 402. As such, meat processors are able to deliver more lipid, thereby generating greater juiciness and palatability without a detectable, unpleasant oily texture. This increased threshold in accordance with the present invention may advance the meat processing industry because exemplary embodiments of the present invention may have both sustained juiciness through reconstitution and an increased cook yield (i.e., less mass is lost during the cooking process), two major and highly interrelated goals of meat processors. In addition to a higher quality reconstituted product, this increased threshold may benefit fresh meat preparation.

Although the health benefits of the above exemplary embodiment provide certain benefits, embodiments that employ other types of lipids remain in accordance with the present invention. For instance, in embodiments, decreased particle size of other lipids may serve to increase palatability through improved distribution without necessarily increasing the nutritional value. In other words, ingredients that modify the nutritive value may be used in accordance with the present invention, but ingredients that achieve certain functional results (e.g., increased robustness) may also be used in accordance with the present invention without the specific goal of increased nutritional value. As such, it will be appreciated that other lipids such as soybean oil, corn oil, beef tallow, high oleic oils, or the like may be used without departing from the scope or intent of the present invention. Additionally, other mimicking agents, such as Z-Trim® (a lipid mimicking agent, available from FiberGel Technologies, Mundelein, Ill.) or the like, may be used without departing from the spirit or intent of the present invention.

An additional embodiment of the present invention that demonstrates a functional ingredient is a homogenized dispersion containing fiber. In accordance with the present invention, the decreased particle size of the fiber better disperses within the homogenized dispersion and thus better disperses throughout the meat. As meat permeated with the fiber laden homogenized dispersion cooks, the fiber exhibits sponge-like qualities to retain moisture, thus increasing the robustness of the cooked product. As such, the decreased particle size within the homogenized dispersion is directly related to improved moisture retention, i.e. juiciness, in the product, because the functionality of the fiber increases with improved distribution. Therefore, the quality, mouthfeel, and palatability are improved in accordance with the present invention. It will be appreciated that different forms of fiber such as derivatives of whole grains, nuts, seeds, fruits, vegetables, or the like may be used in accordance with the present invention.

In yet another exemplary embodiment that demonstrates a functional ingredient, a protein such as soy protein isolate may be included in a homogenized dispersion. Soy is used in the food industry for nutritional, sensorial and functional reasons. For instance, when used as an additive, soy increases the protein content of a meat. Also, soy exhibits water binding properties that increase a meat's ability to retain juiciness upon initial preparation or even reconstitution. Although soy protein isolate is the most highly refined soy protein product available to consumers, it will be appreciated that other forms of protein including other forms of soy, whey, or the like may be used to enhance the homogenized dispersion without departing from the scope or intent of the present invention.

An example of a problematic dispersion in the form of a marinade illustrates the reduced functionality of the prior art. If a lipid, a hydrophobic material, is combined with seasoned water, a hydrophilic material, to create the marinade, and the particle sizes in the dispersion are large, the resulting dispersion will be relatively unstable. Because most commercial meat processing areas maintain a low temperature to prevent bacterial growth, the aggregate globules of liquid fat may congeal within the marinade injector mechanisms and result in inconsistent delivery of the oil to the meat product. Even if the lipid globules remain in liquid form while passing through the delivery mechanism, there will be large pockets of lipid in the meat, rather than evenly distributed lipid. Portions of the meat will not receive the benefits of the lipid. Therefore, large particle size within the problematic colloidal marinade hinders the even distribution and the functionality of the marinade's ingredients.

Figure 5:
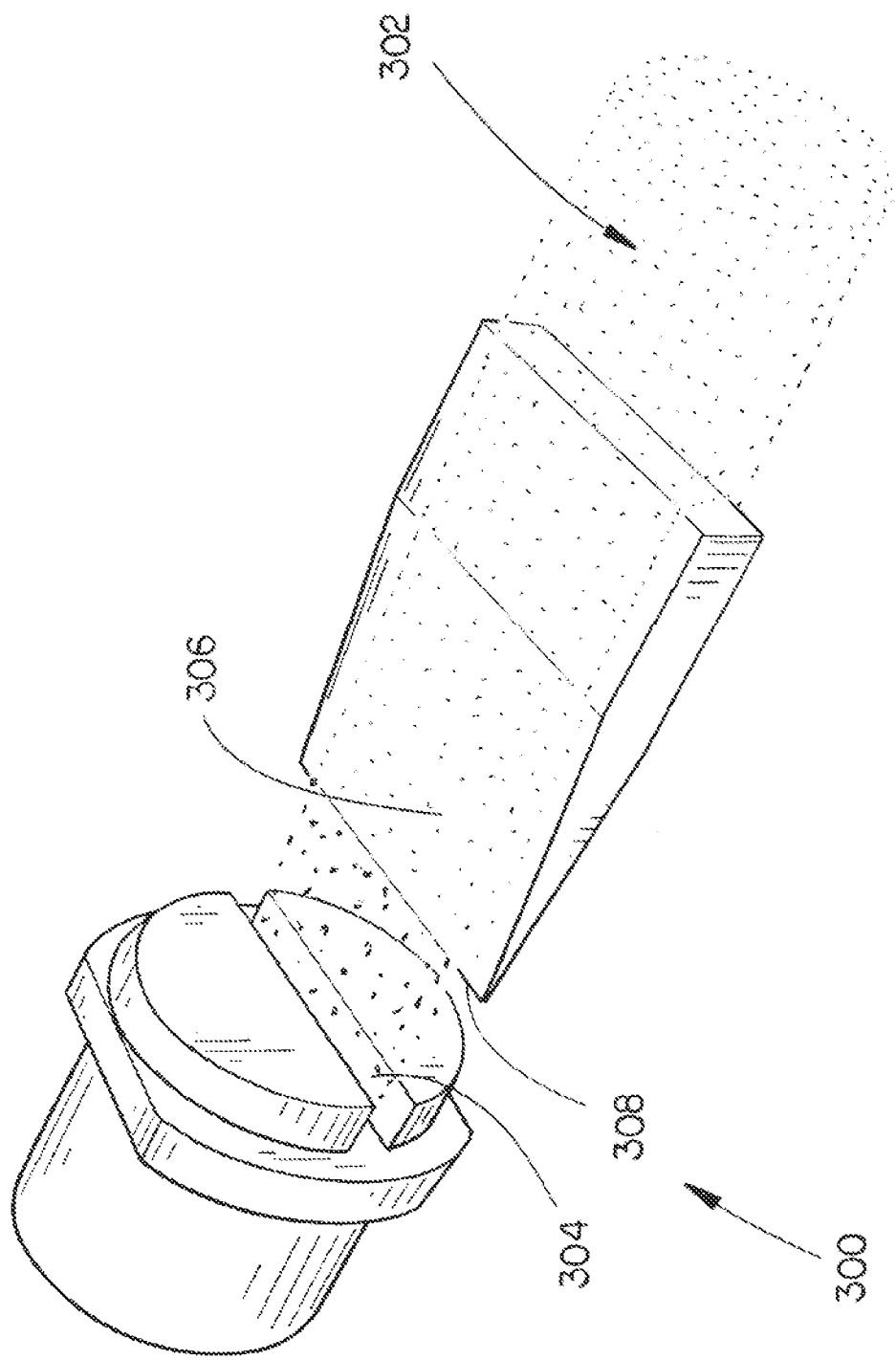
FIG. 5 is a partial isometric view of the blade, orifice, and jet stream portion of the ultrasonic homogenization mechanism in accordance with an exemplary embodiment of the present invention, wherein the uniform dispersion is being homogenized as it travels out of the orifice and over the blade.

Referring generally to FIG. 5, in an exemplary embodiment of the present invention, the process of homogenization of the continuous and dispersed phases may occur via ultrasonic homogenization. Ultrasonic homogenization 300 is a process whereby liquids 302 are pumped through an orifice 304 at pressures of 1500-3000 psi at high linear velocity against a blade 306 cantilevered in the jet stream. The dimensions of the blade 306, together with the other dimension parameters of the system 300, are such that the system operates in the ultrasonic range. As the liquid jet 302 flows over the blade 306, it causes the blade 306 to vibrate very rapidly. This rapid vibration produces an ultrasonic "note." When the system reaches a steady state, a cavitational field is generated at the leading edge 308 of the blade 306. Cavitational pressure fluctuations of up to 60 tons/sq. in. may be generated. It is within this cavitational envelope that the high energy mixing effect is produced. Although current ultrasonic technology utilizes pressures of 1500-3000 psi, it will be appreciated that alternate pressures may still produce the desired ultrasonic "note" without departing from the spirit or scope of the present invention. Further, it will be appreciated that increased fluctuations, greater than 60 tons/sq. in may be generated without departing from the scope or intent of the present invention.

The increased percentage of smaller particles allows for a better mixture of the ingredients. It will be appreciated that the method of reducing the particle size may include other types of liquefiers, emulsifiers, or the like, without departing from the scope or intent of the present invention.

Figure 6:
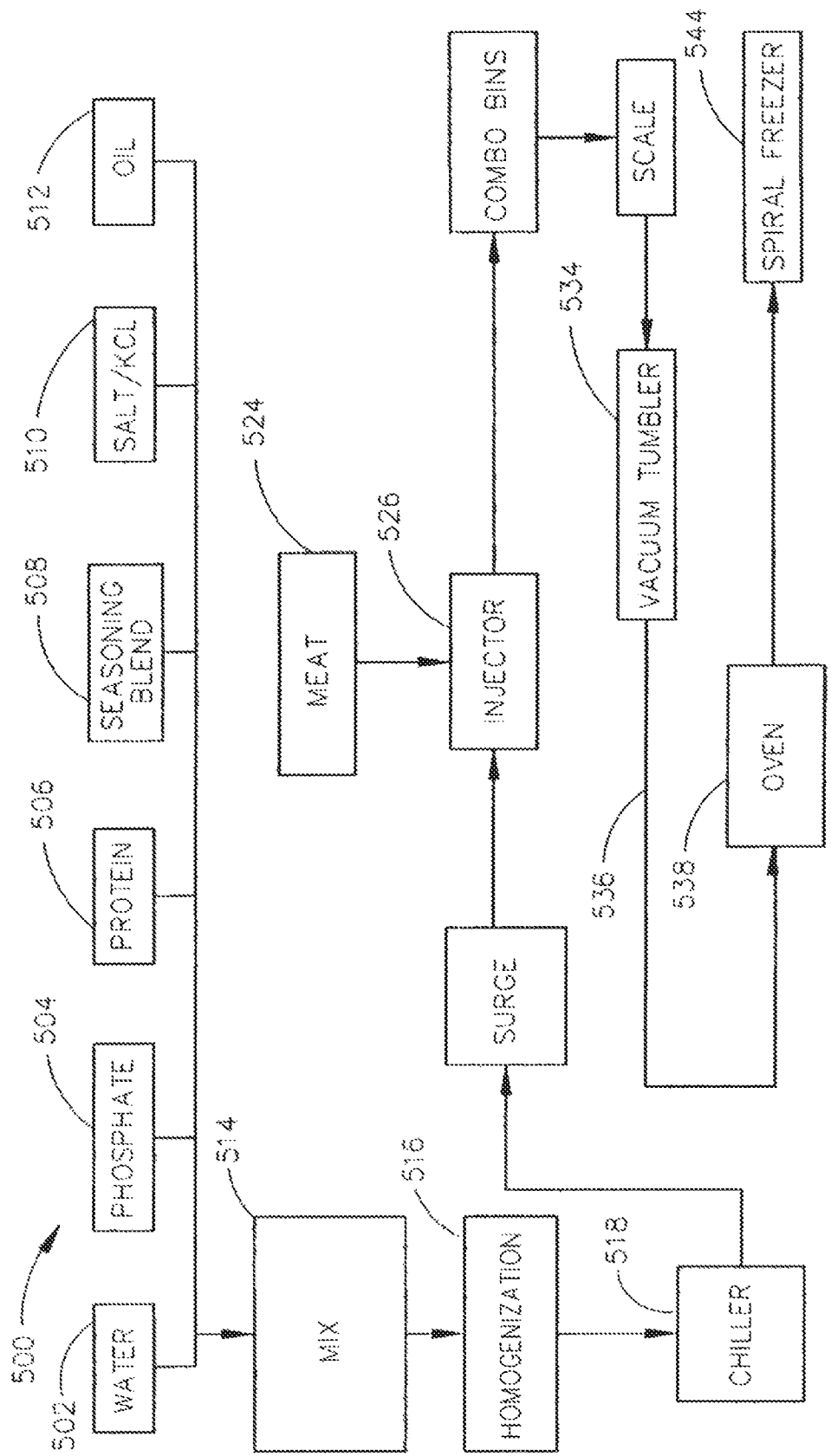
FIG. 6 is a flow diagram illustrating a method for permeating meat with a homogenized dispersion in accordance with the present invention, wherein the original homogenized dispersion ingredients include water, phosphate, protein, seasoning blend, salt, and oil.

Referring now to FIG. 6, this figure illustrates a process 500 of creating permeated turkey breast, in accordance with an exemplary embodiment of the present invention. First, chilled water (below 70° F.) 502, phosphate 504, protein 506, seasoning blend 508, salt 510, and oil 512 are mixed 514 using a high shear mixer. The pre-homogenized mixture is then ultrasonically homogenized 516 in a Sonolator™, available from Sonic Mixing Equipment. Once homogenized, the homogenized dispersion is transferred to a brine chiller to chill the dispersion to 32-36° F. 518. Destrapped, turkey tenderloins 524 are loaded onto the injection belt. The chilled homogenized dispersion is injected 526 into the turkey tenderloins via a needle injector to deliver oil in the amount of 0-4% of the total formula. After injection the tenderloins are vacuum tumbled for ten minutes in a vacuum tumbler 534. After the turkey tenderloins are vacuum tumbled 534, the turkey tenderloins are spread out evenly, on an oven belt 536. The belt carries the turkey tenderloins to a steam oven 538. The turkey tenderloins are cooked until the internal temperature reaches the temperature outlined in the plant Hazard Analysis and Critical Control Point plan (incorporated herein by reference). Generally internal temperatures reaching an end-point of 165 to 185° F. is preferred. After cooking, the turkey is individually quick frozen 544.

A study by the inventors, has determined, in one specific exemplary embodiment of the present invention, the effect of ultrasonic homogenization on the particle size of solids in a meat marinade over time. Two batches of an aqueous solution containing salt, potassium chloride, soy protein isolate, phosphates, oil and seasonings were mixed using a high shear mixer. One batch was then fed through the Sonolator® to form a more uniform dispersion 104. Samples of each batch were analyzed for particle size distribution (Beckman Coulter L5200) every hour for a total of seven hours. The results are summarized in Table 1.

The data shows that the use of ultrasonic homogenization, per step 204 of method 200 of the present invention, reduced the particle size of the ingredients. Also, after seven hours the particle size of the marinade changed only slightly. This indicates that the use of this method 200 will decrease the particle size of ingredients in a meat marinade. Also, particles will not return to their previous size during storage period of seven hours. This facilitates the industrial application of this process.

TABLE 1

Particle Size (μm) Mean and Median values

|  | Mean | Median |
|---|---|---|
| Control |  |  |
| 0 hours | 67.53 | 47.26 |
| 1 hours | 69.75 | 46.63 |
| 2 hours | 60.67 | 35.24 |
| 3 hours | 69.18 | 46.78 |
| 4 hours | 68.40 | 46.49 |
| 5 hours | 68.19 | 45.76 |
| 6 hours | 65.78 | 45.81 |
| 7 hours | 69.41 | 46.06 |
| Test |  |  |
| 0 hours | 34.09 | 21.16 |
| 1 hours | 38.25 | 23.83 |
| 2 hours | 39.88 | 24.96 |
| 3 hours | 37.74 | 23.07 |
| 4 hours | 38.50 | 23.58 |
| 5 hours | 39.28 | 24.33 |
| 6 hours | 38.23 | 23.45 |
| 7 hours | 37.86 | 23.12 |

A marinade containing, water, soy protein isolate, salt, seasonings and an lipid mimetic, Z-trim®, was mixed using a high shear mixer (prior art). A sample of the marinade was collected and particle size distribution data was collected using a Beckman Coulter LS200. The marinade was then homogenized using the present invention with a pressure of 1500 psi. After homogenization, another marinade sample was collected for particle size distribution measurement. The results from this analysis are below. The numbers reported are the average of 2 measurements.

| Treatment | Mean (μm) | Median (μm) |
|---|---|---|
| Before Homogenization | 352.75 | 332.70 |
| After Homogenization | 63.48 | 44.25 |

As the results demonstrate, the present invention significantly decreased the particle size of marinade containing fiber.

In yet another study, performed by the inventors, involving yet another exemplary embodiment of the present invention, to develop a fully cooked turkey tenderloin slice that is superior in tenderness and juiciness than prior art. Three aqueous solutions containing soy protein isolate, phosphates, salt and varying levels of edible oil were mixed at step 202 of the present method 200 with a high shear mixer. Each solution was split into two smaller batches. One batch of each solution was fed through a Sonolator® at step 204 to form a homogenized dispersion. As a result, there were a total of six solutions (3 oil levels×2 mixing procedures for a 2×3 factorial designed experiment). The treatment solutions are listed below.
1. No homogenization, 0% oil
2. Homogenization, 0% oil
3. Homogenization, 1% oil
4. Homogenization, 2% oil
5. No Homogenization, 1% oil
6. No Homogenization, 1% oil Peeled, destrapped turkey tenderloins were injected with one of the six solutions to achieve a pickup of 125% of the green (original) weight. After injection, the marinated tenderloins were tumbled for 10 minutes using a vacuum tumbler. Tenderloins were cooked in a linear, steam oven until an internal endpoint temperature of 165° F. was reached. The cooked tenderloins were sliced and frozen until further evaluation. The frozen slices were reheated in the microwave for sensory panel evaluation. A trained descriptive sensory panel evaluated slices for flavor and texture attributes using a 15-pt intensity scale. A higher score on the scale indicates a higher level of intensity. For example, a score of 1 for firmness would mean that a sample was extremely tender. A score of 15 would mean the sample was extremely firm. For moistness a score of 1 would mean the sample was extremely dry.

This indicates the use of the homogenized dispersion 104 in accordance with the present invention resulted in turkey product that was more tender than the prior art. Consumer sensory evaluation completed agreed with the findings of the trained, descriptive panel.

TABLE 2

Significant ($p < 0.1$) Main Effects Of Trained, Descriptive Panel Texture Attributes

|  | Firmness | Moistness |
|---|---|---|
| Ultrasonic Dispersion |  |  |
| Yes | 5.9 | 8.30 |
| No | 6.2 | 7.98 |
| Oil Level |  |  |
| 0% | 6.4 | 7.8 |
| 1% | 6.0 | 8.1 |
| 2% | 5.7 | 8.4 |

The previously described embodiments of the present invention have many advantages, including providing a method for permeating meat such that a homogenized dispersion disperses throughout the meat, wherein the particle size of macromolecular ingredients within the homogenized dispersion is reduced to form a homogenized dispersion with better dispersion and increased ingredient functionality. As such, a consumer may enjoy the convenience of a fully cooked meat product, wherein danger has been reduced by complying with the USDA's minimum cook temperatures, but tenderness, juiciness, and palatability is improved.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:
1. A process for making a meat product with a homogenized marinade, comprising:
  preparing a marinade, wherein the marinade includes:
    a lipid from about 1.0% to about 20.0% by weight of the marinade,
    water from about 50% to about 90% by weight of the marinade,
    a fiber, and
  passing a stream of the marinade over a cantilevered blade at a pressure from about 1500 to about 3000 psi to produce a homogenized marinade having a mean particle size from about 25 microns to about 40 microns;

feeding at least a portion of the homogenized marinade into an injector; and penetrating the meat with the injector to form a penetration in the meat and injecting the homogenized marinade in the penetration.

2. The process of claim 1, wherein the marinade further includes potassium chloride from about 0.1% to about 10% by weight of the marinade.

3. The process of claim 1, wherein the homogenized marinade includes a mean particle size from about 34 microns to about 40 microns.

4. The process of claim 1, wherein the meat product includes a dispersed lipid distribution that is from about 1% to about 4% by total weight of the meat product.

5. The process of claim 1, wherein the injector includes a multi-needle injector with a centrifugal pump.

6. The process of claim 1, wherein the penetration is between about 1 mm and 4 mm in diameter.

7. The process of claim 1, wherein homogenization is ultrasonic homogenization.

8. The process of claim 1, wherein the lipid includes at least one of: soybean oil, corn oil, beef tallow, and high oleic oils.

9. The process of claim 1, wherein the marinade further includes soy protein.

10. A process for making a meat product with a homogenized marinade, comprising:

preparing a marinade, wherein the marinade includes:
 a lipid from about 1.0% to about 20.0% by weight of the marinade,
 water from about 50% to about 90% by weight of the marinade, and
homogenizing the marinade to produce a homogenized marinade, wherein the homogenized marinade includes:
 an initial mean particle size of about 34 microns, and
 a mean particle size from about 38 microns to about 40 microns between about 1 hour and about 7 hours after homogenization;
chilling the homogenized marinade;
feeding at least a portion of the chilled homogenized marinade into a needle injector;
penetrating the meat with the needle injector and depositing the chilled homogenized marinade in the penetration.

11. The process of claim 10, wherein homogenization is ultrasonic homogenization.

12. The process of claim 11, wherein the ultrasonic homogenization includes streaming the marinade over a cantilevered blade in the stream.

13. The process of claim 12, wherein the ultrasonic homogenization occurs at a pressure from about 1500 to about 3000 psi.

14. The process of claim 10, wherein the meat product includes a dispersed lipid distribution that is from about 1% to about 4% by total weight of the meat product.

15. A process for making a meat product with a homogenized marinade, comprising:

preparing a marinade, wherein the marinade includes:
 a lipid from about 1.0% to about 20.0% by weight of the marinade,
 water from about 50% to about 90% by weight of the marinade, and
homogenizing the marinade with an ultrasonic homogenizer at a pressure of about 1500 psi to about 3000 psi to produce a homogenized marinade, wherein the homogenized marinade includes a mean particle size from about 25 microns to about 40 microns;
chilling the homogenized marinade;
feeding at least a portion of the chilled homogenized marinade into a needle injector;
penetrating the meat with the needle injector and depositing the chilled homogenized marinade in the penetration, wherein the deposit forms a meat product with homogenized dispersion, wherein the meat product with homogenized dispersion includes a dispersed lipid distribution that is from about 1% to about 4% by total weight of the meat product with homogenized dispersion.

16. The process of claim 1, wherein passing a stream of the marinade over a cantilevered blade at a pressure from about 1500 to about 3000 psi includes passing the stream of the marinade over the cantilevered blade at a pressure from about 1500 to about 3000 psi with a cavitational field at a leading edge of the cantilevered blade.

\* \* \* \* \*